United States Patent [19]

Le Mouel

[11] 3,919,653

[45] Nov. 11, 1975

[54] AUTOMATIC FREQUENCY CORRECTOR FOR DIFFERENTIAL PHASE DEMODULATOR

[75] Inventor: Bernard Le Mouel, La Roche Derrien, France

[73] Assignee: Societe Lannionnaise d'Electronique Sle-Citerel, France

[22] Filed: Apr. 22, 1974

[21] Appl. No.: 463,148

[30] Foreign Application Priority Data

Apr. 20, 1973 France ............................ 73.14506

[52] U.S. Cl. ................ 329/104; 325/42; 325/320; 328/109; 328/119; 329/112; 329/122; 329/136; 331/23

[51] Int. Cl.[2] .................... H04L 27/22; H03D 3/18

[58] Field of Search.... 329/112, 104, 136, 122–125, 329/127; 328/119, 109, 110, 155; 325/320, 323, 42, 65; 331/18, 23, 25

[56] References Cited

UNITED STATES PATENTS

| | | | |
|---|---|---|---|
| 3,646,447 | 2/1972 | Van Gerwen | 329/122 X |
| 3,753,114 | 8/1973 | Burley | 329/122 X |
| 3,787,775 | 1/1974 | Lanning | 331/23 X |
| 3,838,350 | 9/1974 | Ewanus et al. | 329/122 X |

*Primary Examiner*—Alfred L. Brody
*Attorney, Agent, or Firm*—Craig & Antonelli

[57] ABSTRACT

Correcting device ensuring automatically, at the receiving end, an exact timing of the frequency demodulated at the rated value, that timing being necessary for the demodulation to be effected correctly, the correction being effected by a frequency servo-controlling based on an error signal extracted from a frequency discriminator, by means of a processing of decoded logic signals.

4 Claims, 3 Drawing Figures

AUTOMATIC FREQUENCY CORRECTOR FOR DIFFERENTIAL PHASE DEMODULATOR

The invention comes within the branch of data transmission by modulation of a carrier by phase jump or differential phase. It concerns a corrector device ensuring automatically, at the receiving end, an exact timing of the demodulated frequency at the rated value, that timing being necessary for the demodulating to take place correctly, the correction being made by a servo-controlling of the frequency based on an error signal extracted from a frequency discriminator, by means of a processing of decoded logic signals.

In the transmission by the modulation of a differential phase, the proper operation of the demodulator requires a great stability of the frequency which it receives, due to the fact that it contains delay lines which are dimensioned to give a quite accurate dephasing at the rated frequency: if the frequency reaching the demodulator deviates from the rated frequency, the rated dephasing is no longer obtained and the demodulator causes errors in demodulation. As the frequency emitted in the line can deviate, an automatic correction of the frequency at the receiving end is therefore necessary.

The known solution for producing such a device consists, for a received modulated wave having n phase states, in multiplying the frequency by $n$, this being equivalent to erasing every trace of phase modulation in the multiplied frequency wave, which is applied to a frequency discriminator, which supplies an error signal which is used in a frequency servo-control system including a local oscillator. The frequency multiplication may be difficult to produce if the frequency received is high.

In a related patent, a new type of frequency corrector, which comprises a frequency discriminator giving a zero signal when the frequency is at the rated value has been described. That frequency discriminator comprises essentially a phase discriminator on which arrives on the hand, the direct wave, on the other hand, the wave delayed by an instant $\tau$ by a delay line. When the dephasing $\omega\tau$ produced by the delay line is equal to a quadrature, the discriminator supplies a zero output signal. A connected device, connected up to the output of the demodulator, ensures, by means of a sampling means, the extraction of the output signal of the discriminator exclusively at the periods when the quadrature is produced, in principle, in the discriminator: an error signal therefore leaves therefrom if the frequency has deviated.

According to the present invention, which also uses a discriminator producing a zero output signal in the case where the received frequency causes an exact quadrature in the delay line, an internal compensation device permanently ensures the transmission of a zero signal behind the discriminator at the rated frequency by means of a processing of decoded logic signals: by means of that new combination, the sampling means is dispensed with.

The delay line is dimensioned so as to supply a delay of a modulation clock period (or, even, of a "bit instant"). For the phase shifts in quadrature between adjacent bit instants, the discriminator will provide a zero output voltage. For other phase shifts between adjacent bits, the discriminator will provide a first non-zero output signal, either positive or negative: a simple element which reconstitutes a second signal having the same polarity as the said first signal is connected to the demodulator: a subtractor receiving the first signal and the second signal provides permanently a zero output signal if the frequency has the rated value.

The invention will be described in detail with reference to the accompanying drawings, among which:

Figure 3:
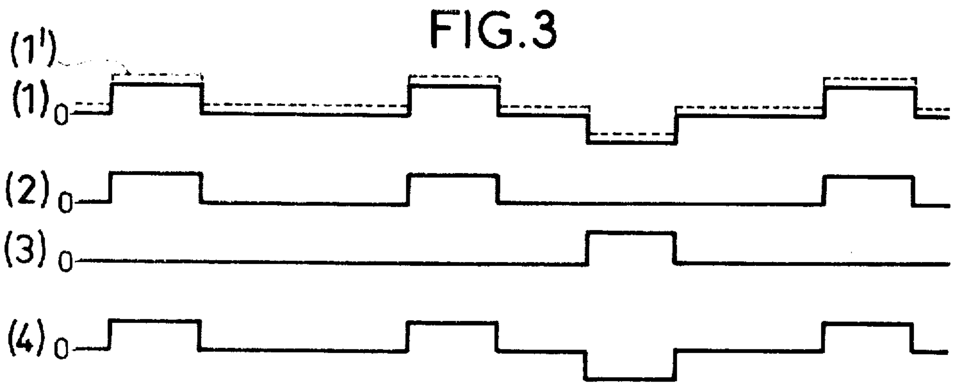

FIG. 3 contains graphs explaining the operation of other elements of the device.

Figure 1:
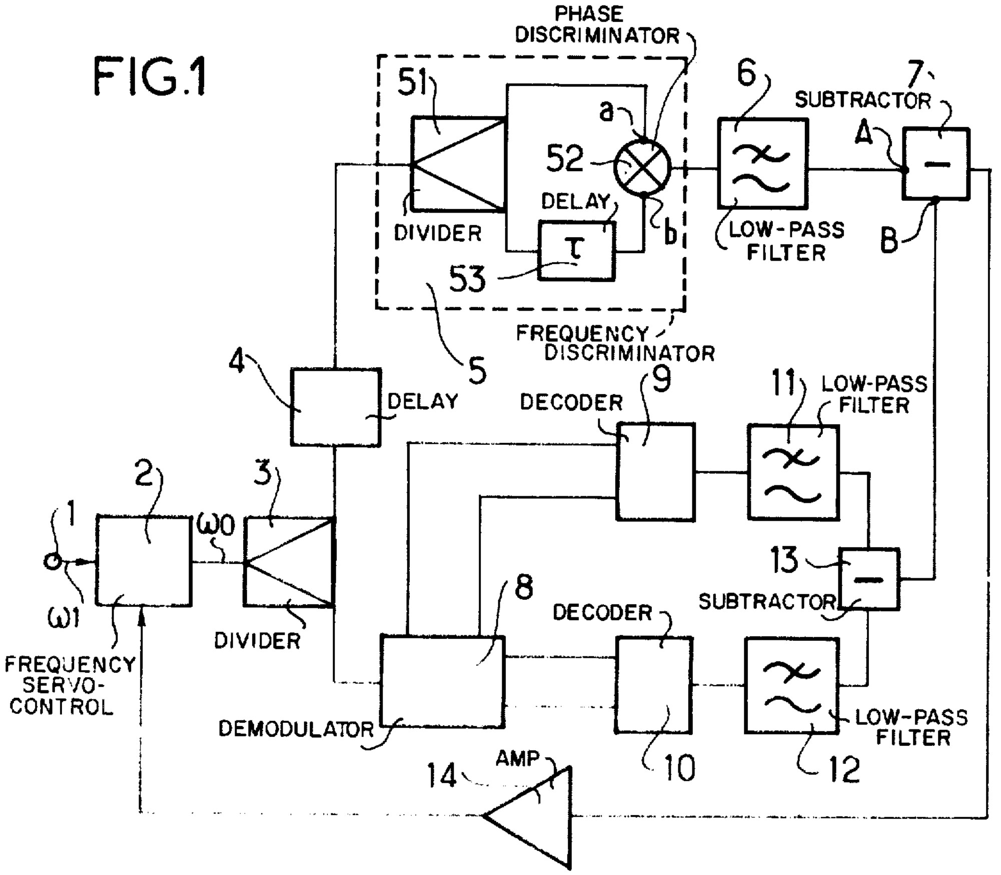
FIG. 1 is a general diagram of a form of the device according to the invention.

FIG. 1 — the complete device comprises an input terminal 1 on which arrives a carrier $\omega$ 1 modulated in differential phase; a frequency servo-control device 2, which provides, at the output, a corrected frequency $\omega o$ at rated value for an exact correction. 3 is a power divider which supplies, on one side, a branch comprising a delay element 4, a frequency discriminator 5, a low-pass filter 6, a first input A of a subtractor 7.

The element 3 also supplies a second branch containing a demodulator 8 which is constituted effectively by m' unitary demodulators in parallel for a modulation having $2^m$ phase states, corresponding, at the outputs, to m demodulated trains, the number of unitary demodulators $m'$ is generally greater than $m$. 9 and 10 are two extra decoders connected up behind the demodulator 8. 9 is in series with a low-pass filter 11; 10 is in series with a low-pass filter 12. A subtractor 13 receives the output signals of the filters 11 and 12. The output of the subtractor 13 is connected to a second input B of the subtractor 7, whose output signal, amplified by an amplifier 14, is applied to the frequency servo-control device 2.

The frequency discriminator 5 is constituted by a power divider 51, which is applied directly to a first terminal $a$ of a phase discriminator 52 and is applied to a second terminal $b$ of the phase discriminator through a delay line 53, having a duration $\tau$.

The low-pass filters 6, 11 and 12, which have a same cut-out frequency, are used for making the spectra of the signals arriving on the subtractor 7 uniform. The delay element 4 is intended for compensating the reply delays of the demodulator 8 and of the connected circuits.

Figure 2:
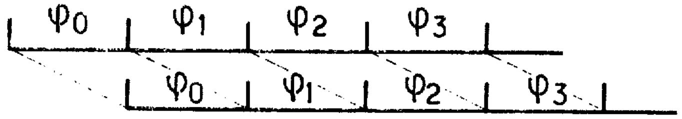
FIG. 2 is a graph explaining the operation of an element of the diagram according to the diagram in FIG. 1.

FIG. 2 — the graph in FIG. 2 shows, on a first line, the successive phase bits 0, 1, 2, etc. arriving on the terminal $a$ of the phase discriminator 52 (FIG. 1) and the same bits delayed by one bit instant by the delay line 53 arriving on the terminal $b$.

FIG. 3— FIG. 3 shows five graphs (1), (1'), (2), (3), (4).

Graph (1) shows an assumed example of a signal reaching the terminal A of the subtractor 7: for certain clock instants, the discriminator 5 provides a zero signal; for others, it provides a positive signal or a negative signal, according to the polarity of the phase shift between successive bits. If these signals have a non-zero average value (graph (1')) that non-zero value is considered as an interference value for the servo-controlling.

The decoder 9 is established according to a simple logic circuit suitable for providing a logic binary signal in correspondence with the positive interferences (for example), graph (2) and the decoder 10 is established so as to provide a logic binary signal in correspondence with the negative interferences, graph (3).

The subtractor 13 operates, for example, the physical subtraction: graph (2) — graph (3): it therefore provides at the output a result according to graph (4), which is in compliance with graph (1). The subtraction which is effected in the subtractor 7 therefore provides a zero output signal if the pulse $\omega o$ has the rated value (graph (1)) and an error signal in the contrary case (graph (1')).

The frequency correction is therefore ensured with security, without disturbance by the interferences, by simple and noncritical means. The present solution could therefore be preferred in certain cases to the devices having sampling means and generators of fine pulses, described in the related patent, for at high frequencies, such elements are less reliable than decoders or subtractors.

$\tau$ delay instants of the discriminator may assume any value whatsoever between 0 and the duration of a bit instant, or moment, only on condition that it produces the quadrature over a part of the moment.

What is claimed is:

1. An automatic frequency corrector for a frequency servo-controller for frequency transposition in a demodulator of a wave modulated by differential phase, comprising a phase discriminator receiving on one input said modulated wave and on a second input the same modulated wave delayed by a time $\tau$, said phase discriminator providing at its output a first bipolar signal, a demodulator receiving said modulated wave, a first decoder connected to said demodulator for providing binary signals corresponding to the positive portions of said bipolar signal, a second decoder connected to said demodulator providing binary signals corresponding to the negative portions of said bipolar signal, a first subtractor responsive to the outputs of said first and second decoders for providing a second bipolar signal, a second subtractor connected to receive said first and second bipolar signals, and means for connecting the output of said second subtractor in control of said frequency servo-controller.

2. An automatic frequency corrector as defined in claim 1, further including a low-pass filter connected between each of said first and second decoders and the inputs of said first subtractor to which they are connected.

3. An automatic frequency corrector as defined in claim 2 wherein a further low-pass filter is connected between the output of said phase discriminator and the input of said second subtractor.

4. An automatic frequency corrector as defined in claim 3 wherein the inputs of said phase discriminator and said demodulator are derived from respective outputs of a power divider connected to the output of said frequency servocontroller.

* * * * *